Patented July 5, 1938

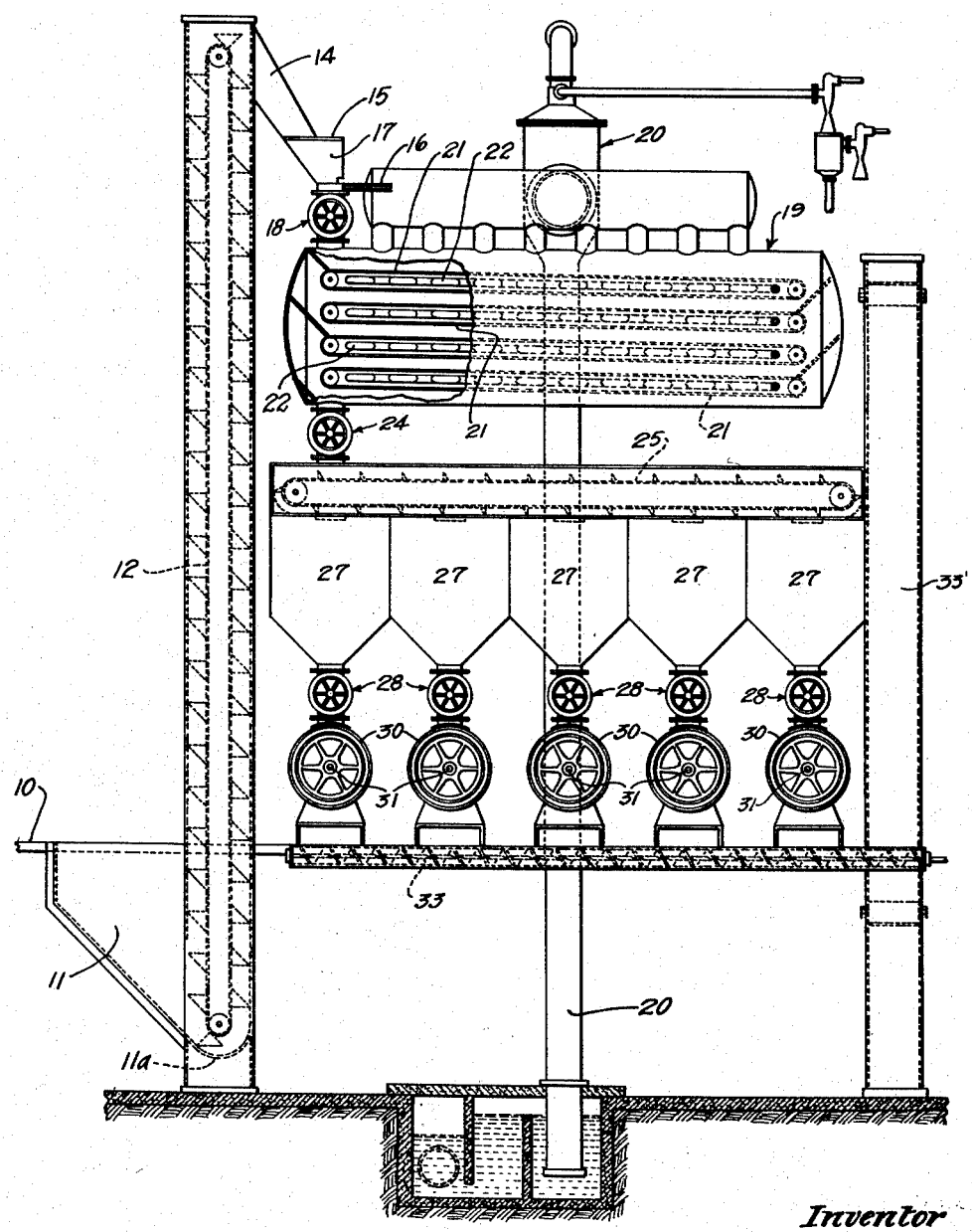

2,123,080

UNITED STATES PATENT OFFICE 2,123,080

METHOD AND APPARATUS FOR TREATING FOOD REMNANTS

John E. Rowland, Long Beach, Calif.

Application December 18, 1934, Serial No. 758,039

3 Claims. (Cl. 34—24)

The present invention relates to the treatment of garbage composed of food remnants and table wastes to convert them into a stable, nutritious food for poultry, hogs, and other livestock.

Various methods of treating such products have been devised for removing the water and fats present, for in the presence of these constituents the wastes are subject to very rapid decomposition by bacterial action. However, these prior methods have involved cooking or drying the food remnants at relatively elevated temperatures, sometimes as high as 400° F., and as a result many difficulties have arisen.

At such advanced temperatures many of the organic compounds undergo radical changes; for example, vitamines disappear, mineral salts break down, and certain foods become very difficultly digestible. After a time at these high temperatures, fats carbonize and sugars carmelize so that the quality and appearance of the product is adversely affected. Likewise, many light oils and readily volatile constituents vaporize and are lost completely.

It has been customary to cook the food remnants in large quantities so that stirring is necessary to insure proper cooking and drying. This agitation causes emulsification of the free fats and oils with the large amount of water present, and it requires a much longer time now to drive off the water since it is difficult to break down the emulsion. As a result, the total time of cooking is lengthened over that required when no emulsification occurs, and the deleterious temperature effects on the foods, as above mentioned, are accentuated. Also, more time, a larger plant, and greater expense is made necessary because of the emulsification.

Hence it is a general object of my invention to preserve the nutritive values of the food remnants in their original state as far as possible, and to prevent loss or decomposition of the various constituents by high temperature cooking.

It is also an object of my invention to produce a dehydrated and sterilized product that is quite stable.

A further object is to treat the garbage without causing emulsification of the fats with the water and to greatly reduce the time required to dehydrate the mass. Since garbage, when gathered, contains a large percentage of water, rapid and effective water removal is a major step in the treatment, and savings in time or plant required will effect large economies in the cost of installing and operating large garbage disposal plants.

Another object is to devise a process that is adapted to continuous treatment, since it is more economical than batch methods.

I have attained these objects in my novel method by first dehydrating the food remnants at a sub-atmospheric pressure permitting water to be vaporized at a relatively low temperature. The material is spread out in a thin layer so that a large amount of exposure to the surrounding atmosphere is obtained; and during the dehydrating process the garbage is kept free from agitation so no oil-water emulsion is formed. The material is then cooked at a higher temperature for a sufficient time to thoroughly sterilize it, after which it may be suitably treated to remove the fats.

A better understanding of how these objects are reached will be had from the following description in which reference is made to the annexed drawing showing the process diagrammatically.

The garbage is dumped from trucks on platform 10 and falls down chute 11 at the bottom of which it is picked up by buckets on elevator 12. Much of the free water drains off the garbage while in chute 11 and elevator 12, the water passing thru a perforated plate 11a at the bottom of the chute. At the top of the elevator, the food remnants are dumped into chute 14 and deposited on picking table 15 where the incoming material is sorted by an operator on walk 16 to remove glass, bones, metal objects and other foreign bodies. After sorting, the garbage is dropped into hopper 17 which opens thru airseal valve 18 into dehydrator 19 that is kept at a suitable sub-atmospheric pressure by condenser 20. The condenser may be of any suitable type; but it is here shown as being a conventional barometric type which removes by condensation the water vapor and by two- or three-stage ejectors the fixed gases from the dehydrator, thus maintaining a suitably high vacuum.

By maintaining in the dehydrator a high vacuum, the water content of the material being treated will completely vaporize at a much lower temperature than when subjected to atmospheric pressure, as will be understood. Typically, if a vacuum of twenty-six inches of mercury is maintained, that is an absolute pressure of about four inches of mercury, the water will vaporize at 125° F. A slightly higher temperature is maintained in the dehydrator so that the garbage is heated to around 130°–135° F.; and within this range of temperatures the food values of the remnants are not destroyed, even by prolonged cooking.

Air-seal valve 18 is of a type suitable to admit a continuous flow of food remnants into the dehydrator without destroying the vacuum within the vessel. The garbage is dropped thru valve 18 so that it spreads out in a thin layer on conveyor 21 with substantially all of the individual particles of the garbage exposed, at least in part, to the surrounding atmosphere. Conveyor 21 is a foraminous member moving over steam coils 22 spaced slightly beneath the conveyor. These coils not only heat the mass of garbage, but catch and vaporize the free liquid draining off the garbage; and to facilitate this flashing of free liquid the coils may be provided with fins, or otherwise formed and arranged. Being in a thin layer, much free liquid drains rapidly from the remnants; and with the large amount of exposure there is a rapid heat transfer not possible when the remnants are treated in a compact mass. Because of the small temperature rise necessary to reach the boiling point of water and the large area exposed, the time required to dehydrate the food remnants is much less than needed for present methods, thus effecting great economies in plant and operation costs.

As the conveyor 21 moves along within the dehydrator, the food remnants are undisturbed and are free from agitation so that no oil-water emulsions are formed that are difficult to break down. The conveyor may consist of a single level, but the dehydrator may conveniently be made shorter by using a conveyor having several levels as shown, the food remnants dropping by gravity from one level to a lower one at the end of each course. Such a transfer is attended by no undesirable agitation, but is in fact advantageous since the remnants are thereby turned on the conveyor and fresh surfaces are exposed to the surrounding atmosphere.

When the remnants have become well dried, they are discharged thru air-seal valve 24 onto a second conveyor 25 which carries them to one of a battery of hoppers 27. At the bottom of each hopper 27 is a suitable valve 28 for admitting garbage directly into a steam jacketed digester 30 beneath the hopper 27. The digesters may be of any suitable type, being here shown as a conventional type with a steam jacket and shaft 31 with paddles for mixing. These cooking units may be operated under atmospheric or sub-atmospheric pressures (by connecting to the barometric condenser) as desired. In general they are held at a higher temperature than the dehydrator unit, but only high enough to insure killing bacteria. A temperature of 165°–185° F. is sufficient for this purpose, and the food remnants are cooked long enough to be pasteurized and to kill all bacteria that might cause decomposition of the finished product. If desired, this heat treatment may be extended to produce as an end product, a stock feed sufficiently dry for transportation and storage without decomposition.

If the end product is to be fertilized, material from the digester is carried by a common conveyor 33, 33' to suitable apparatus, not shown, for extracting fat and oils, and for classifying and sacking the finished product. The removal of fats may be accomplished by presses or solvent extraction as wished, and the subsequent operations may be performed by conventional types of machinery.

Having described my novel method in a preferred form, it is to be understood that the foregoing description is to be considered as illustrative of, rather than restrictive upon the claims appended hereto, since variations in steps and procedure may be made without departing from the spirit and scope of my invention.

1. The process of dehydrating food wastes containing a relatively large amount of free liquid, that includes removing substantially all the free liquid at a temperature of 130°–135° F. and an absolute pressure of about four inches of mercury while the wastes are maintained quiescent, and subsequently exposing the wastes to a temperature of about 165°–185° F. while agitating the wastes.

2. The process of dehydrating food wastes containing a relatively large amount of free liquid, that includes the continuous operation of removing free liquid by spreading the wastes in a thin layer permitting rapid drainage and rapid heating, continuously moving the layer of wastes in a quiescent state through a dehydrator maintained at sub-atmospheric pressure and a temperature at least sufficient to boil water, draining off free liquid during movement of the layer of food wastes, and evaporating the drained liquid within the dehydrator but not in contact with the wastes; and the subsequent batch operation of placing batches of the product from the dehydrator in digesters, agitating the batches, and heating the batches to a temperature in excess of the dehydrator temperature but not high enough to break down the organic constituents of the food wastes.

3. In an apparatus for treating food wastes, the combination of a dehydrator, air seal inlet and outlet valves for introducing and removing food wastes from the dehydrator, continuous conveyor means within the dehydrator for moving the food wastes substantially without agitation from the dehydrator inlet to the outlet, steam heating members supplying heat to the dehydrator, means for maintaining a sub-atmospheric pressure within the dehydrator, a plurality of batching digesters, heating means for the digesters, agitating means within each digester, a second conveyor means adapted to receive food wastes at the dehydrator outlet and convey the same to any selected one of said digesters, and a third conveyor means adapted to collect the finally treated food wastes from all the digesters.

JOHN E. ROWLAND.